INVENTOR.
JOHN G. MURRAY
ELLIS D. SIMON
GEORGE BRONNER
GEORGE D. EDMONDS

United States Patent Office 3,475,620
Patented Oct. 28, 1969

3,475,620
HEAVY CURRENT ARCING SWITCH
John G. Murray, Cranbury, Ellis D. Simon and George Bronner, Trenton, and George D. Edmonds, Princeton, N.J., assignors to the United States of America as represented by the United States Atomic Energy Commission
Filed Dec. 29, 1967, Ser. No. 694,545
Int. Cl. H01h 9/30, 33/04
U.S. Cl. 307—136
4 Claims

ABSTRACT OF THE DISCLOSURE

The switching of DC current in circuits where high voltage is present or induced is accomplished by pulsing an auxiliary circuit which momentarily diverts the current around the switch. This procedure of forcing the current in the switch to zero permits the use of conventional AC current interrupting methods to be used on DC high voltage circuits.

BACKGROUND OF THE INVENTION

This invention was made in the course of, or under a contract with the U.S. Atomic Energy Commission.

In the field of plasma research a need exists for switching large amounts of inductively stored energy. These energies are up to thousands of joules and involve currents of thousands of amperes, for example, consideration has been given to constructing a 20,000 ampere, 15 megajoule coil, where induced voltages as high as 20 kv. are required. In interrupting the large inductive circuit there is no driven point of current zero (while there is energy remaining in the inductor) where an arc in a switch or breaker can deionize and build up a dielectric strength to a value where the switch can hold off reapplied voltages. In supplying pulsed power for such systems as thermonuclear research devices, it is desirable that the inductor circuit be interrupted many thousands of times without dissipating a major portion of the stored energy in the switch and without resulting in severe damage to the switch.

One way of reducing switch damage is to place a capacitor bank across the terminals of the switch, which will on interruption be charged to the peak voltage determined, neglecting resistance, by $V = I\sqrt{L/C}$, where V is the peak voltage and I is the current interrupted. However, for a plasma research source storing several megajoules of inductive energy, the capacitor bank would have to be of equal storage capacity, and this solution is extremely expensive. Likewise, interrupting fuses have been used, but this solution becomes less practical since plasma research systems often require a pulse rate approaching several pulses per minute.

It is an object of this invention, therefore, to provide a compact, fast acting, single, effective and inexpensive switch for large currents and voltages by momentarily diverting the current around the switch so as to force the switch to current zero.

It is a still further object to provide for the convenient repetitive use and fast discharge and cut off at predetermined times of large energy supplies for systems such as high temperature plasma apparatus.

SUMMARY OF THE INVENTION

In accordance with this invention, a main switch or breaker is actuated and an auxiliary switch is turned on to drive the current through the breaker to zero. In one embodiment, a fast acting ignitron connects the terminals of the breaker with low rated combination of inductance and capacitance to provide a predetermined rise and fall of the pulsed current to zero. With the proper selection of elements, as described in more detail hereinafter, the desired switching is achieved.

The above and further objects and novel features of this invention will be described in more detail hereinafter in connection with the attached drawing. It is expressly understood, however, that the drawing is not intended as a definition of the invention but is for the purpose of illustration only.

BRIEF DESCRIPTION OF THE DRAWING

In the figures where like elements are referenced alike.

DESCRIPTION OF THE PREFERRED EMBODIMENT

Figure 1:
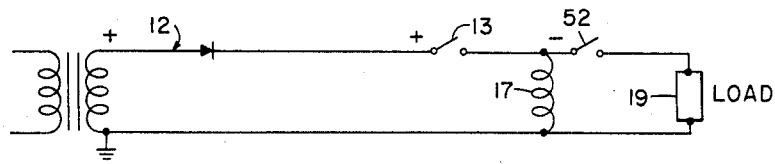
FIG. 1 is a partial schematic diagram of a high voltage direct current transmission line and inductive energy storage circuit.

In understanding this invention as it is applicable to interrupting inductive circuits, reference is made to FIG. 1, which presents the difficulty that there is no point of current zero where an arc channel can deionize and build up dielectric strength to a value where it can hold off the recovery voltage of the circuit. This recovery voltage induced across switch 13 is generated by the release of energy stored in an inductance 17 that is proportional to the inductance of the circuit and also to the square of the instantaneous value of the current. Additionally, in supplying pulsed power for thermonuclear devices from the inductive energy storage system, there exists the problem of opening the breaker or switch 13 at a precise time without dissipating a major portion of the stored energy in the switch resulting in severe switch damage. In this circuit, moreover, which consists of source 12, switch 13, inductor 17 and load 19, the energy stored in the inductor is to be dissipated in the load with some restrictions on the maximum voltage. Inductor 17 is charged by closing switch 13, which is connected to source 12.

In response to these requirements at Princeton University's Plasma Physics Labratory, tests have shown that the switching can be accomplished by providing a current zero with a small pulsed power supply that deionizes the arc in a conventional switch 13.

Figure 2:
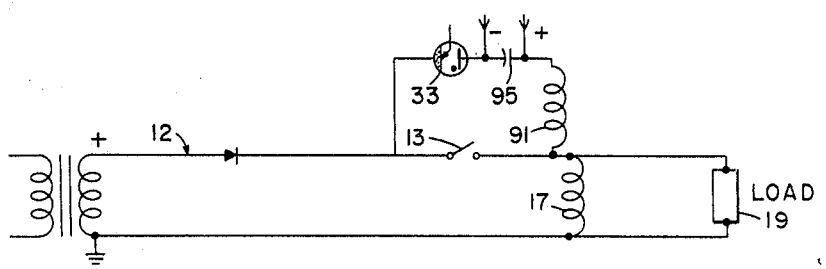
FIG. 2 is a partial schematic diagram of a small pulsed power supply that deionizes an arc in a switch to interrupt an inductive circuit by pulsing current to zero.

To this end a relay switch 13, illustrated in FIG. 2, rated at 15 amperes, 600 v. AC, or 10 amperes, 230 v. DC, with two breaks in series, satisfactorily interrupts a 1 henry circuit carrying 40 amperes having a stored energy of 800 joules. Moreover, the relay functions satisfactorily in allowing a voltage of 2 kv. to be developed across the load 19 and switch 13 with a rate of rise of 2 volts/μsec. A half henry inductor 17 extends the energy level to one megajoule with a three pole circuit breaker 13 rated at 1600 amperes, 250 v. DC, 600 v. AC. The load resistance is high compared to inductor 17 of FIG. 1, whereby the extra switch 52 of FIG. 1 is not required. The current in switch 13 is pulsed to zero by discharging the energy in capacitor 95 through inductor 91 when the auxiliary circuit switch 33 is closed.

Figure 3:
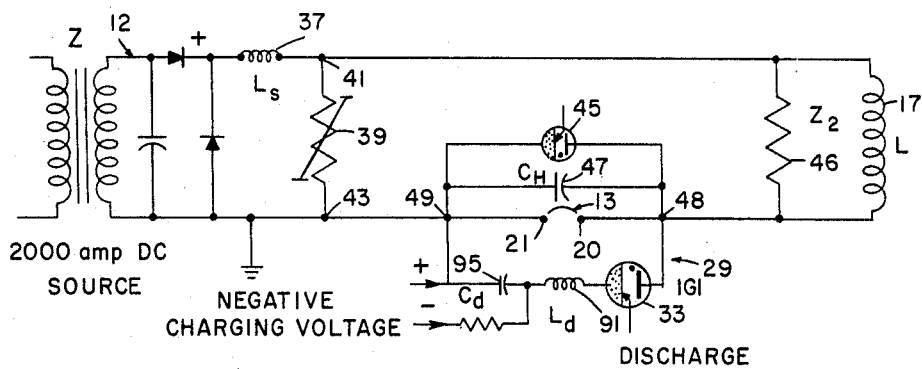
FIG. 3 is a partial schematic diagram of the basic circuit of this invention.

The basic circuit used for high temperature plasma research devices, in accordance with this invention, is shown in FIG. 3 for a standard breaker 13, type DB50, rated at 1600 amperes, 600 volts AC, 60 Hz. or 250 volts DC having three poles, of which only one is used in this circuit. Standard arcing contacts and arc chutes are used. A DC source 12 capable of delivering up to 2000 amperes charges the inductor 17 with a time of 3 seconds. When interruption of the circuit is required, the circuit breaker 13 is tripped, the contacts begin to separate, and an arc is drawn across the contacts. After a few milliseconds, the discharge circuit, which consists of a capacitor 95 and inductor 91 and an ignitron 33, is fired to force a current zero in the circuit breaker 13 and to extinguish the arc. The bank of load resistor 46 capable of safely dissipating the total energy stored (1MJ) is placed across the inductor and limits the peak voltage induced when the current is interrupted across contacts 20 and 21 of switch 13.

When the current in switch 13 is interrupted, the energy stored in the inductance of the charging supply 37, also has to be dissipated without the generation of high over-voltages. This is achieved with a small bank of non-linear resistors 39 placed over the supply terminals 41 and 43.

In order to prevent unnecessary damage to the contacts and the arc chutes of the circuit breaker 13 when above its ability to interrupt the arc, a crowbar ignitron 45 is placed across the breaker 13. When the circuit breaker arc does not deionize properly the crowbar ignitron is fired automatically and shorts out the breaker, thus preventing damage.

The discharge circuit is oscillatory and is designed with a peak working voltage of about 20 kv. The frequencies used are between 150 and 1000 Hz. and the amplitude of the current is variable over a wide range to allow the current in the circuit breaker 13 to be pulsed from any desired operating value to zero. The frequency of the discharge, and the extent to which the pulse current exceeds the steady operating current in the circuit breaker 13, determines the rate of change of current in the arc prior to current zero. The design of the discharge circuit is generally optimum when there is a small overshoot of current, which allows a negative voltage to appear across the interrupted terminals of breaker 13. Also, the rate of rise and maximum negative voltage must be within the capabilities of the arc interrupter of breaker 13. This method of operation gives the maximum time for the breaker 13 to recover before high voltage induced in the main circuit inductance is reapplied across the breaker 13 terminals.

After arc interruption the current of main circuit charges the capacitor 95. The rate of rise of charge and peak voltage that is impressed across the interrupter is a function of the main circuit components as well as the pulsed discharge circuit. However, the peak voltage is mainly dependent on the current and the load impedance resistor 46, and the rate of rise of voltage is principally determined by the current and the total capacitance across switch 13. The discharge circuit 29 connects across terminals 48 and 49.

In the case where the discharge pulse current is made exactly equal to the initial current, the rate of change of current is zero when the arc voltage is zero. If the resistance is neglected, the voltage across capacitor 95 is given by $v = V \sin \omega t$ where $v$ is the instantaneous voltage, $V$ is the peak of the oscillation, $\omega$ is angular frequency=

$$\frac{1}{\sqrt{L_T C_d}}$$

and $L_T$ equals $L_d$ plus the load inductance, and $$dv/dt = \omega V \cos \omega t$$

which is maximum when $$\frac{dv}{dt} = \omega V = \frac{V}{\sqrt{L_T C_d}}$$

Also, neglecting the resistance $$V = I \sqrt{\frac{L_T}{C_d}}$$

so combining the above equations, $$C_d = \frac{I}{dv/dt}$$

where $dv/dt$ is the interrupter's recovery voltage rating.

Figure 4:
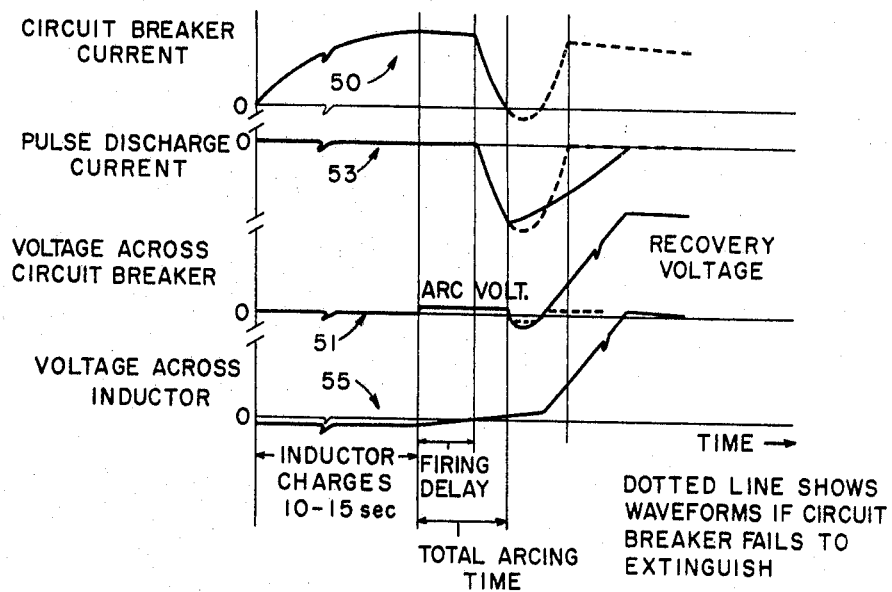
FIG. 4 is a partial graphic illustration of typical waveforms in the system of FIG. 3.

In practice, the onset of this rise of recovery voltage is delayed by pulsing the current of the discharge circuit through, and not exactly to zero. It can also be modified by the use of an additional capacitor 47 connected across the switch 13 terminals. FIG. 4 shows typical waveforms 50 and 51 of current and voltage in the breaker 13 and the discharge circuit 29 and voltage across the interruption created by pulsing the current to zero. The lines 53 and 55 show the waveform of the pulse discharge current and voltage across the inductor.

In operation, the time required for the test breaker 13 to open with no current flowing is about 24 msec. and from contact separation to fully open (~2 inches) requires an additional 25 msec. The arc voltage, which varies with time and currents varying from 500 to 2000 amperes, shows that as the arc is first struck, the arc voltage is 20–40 volts but quickly fluctuates and climbs to a mean of about 400 volts in 5 to 10 msec. The increase in voltage is interrupted as the result of the arc traveling up the arc chute where the plates split up the arc into sections, thereby raising the arc voltage.

A capacitor bank of 190 μf. and a 1 mh. coil achieve the highest effective frequency of 355 Hz. An additional capacitor bank placed across the contacts of the circuit breaker 13 modify the initial $dv/dt$ and delay the onset of the main voltage rise. With capacitor 47 at 133 μf. the delay is typically 700 μsec., and with the capacitance of capacitor 47 at zero, the delay is typically 350 μsec. The degree of overpulse in each case is approximately the same, i.e., 100%.

A current of 2000 amperes with the limits imposed by the load inductor 17, is successfully interrupted with peak voltages up to 16 kv. generated across the contacts of the circuit breaker 13. The maximum $dv/dt$ is satisfactorily obtained when the total capacitance is 190 μf. and the peak $dv/dt$ is 10 volts per μsec. after the delay of 350 μsec.

With a capacitor 95 of 190 μf. charged to 4.6 kv., the peak pulse current is 2000 amperes and the energy stored in the pulse circuit 29 is 2 kilojoules. Thus the ratio of the energy switched from the inductor 17 to the energy stored in the pulse circuit 29 is 500:1.

Actual tests have shown that by the use of the pulse discharge circuit of this invention, which produces an artificial current zero, an AC circuit breaker 13, without magnetic blowout coils or compressed air blast, successfully interrupts an inductive direct current of 125% of the current rating. Moreover the voltage generated across the circuit breaker contacts on interruption, e.g., 16 kv., is 25 times its rated AC line voltage. Additionally the maximum rate of rise of voltage withstood by the circuit breaker 13 is 10 volts per μsec., after an initial delay of about 350 μsec. In these tests the limitations were those of the test circuit rather than the circuit interrupter.

Figure 5:
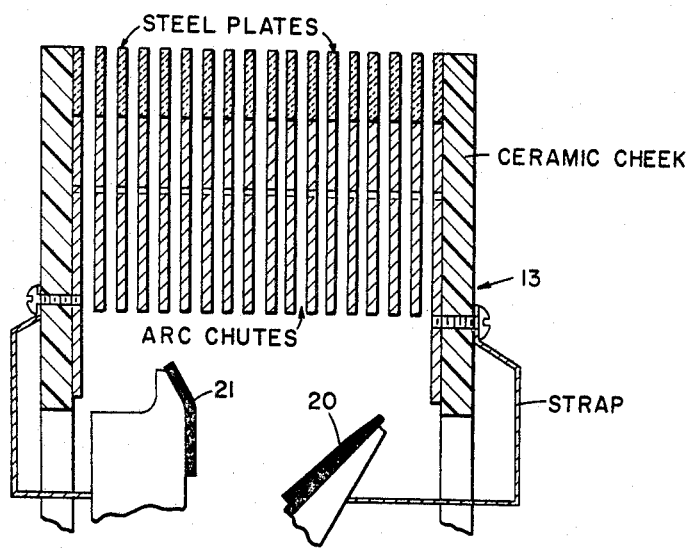
FIG. 5 is a partial cross-section of a conventional switch for use with the circuit of FIG. 3.

A paricular DC breaker package for use with the pulsing and unidirectional current interrupter circuit of this invention for a particular load is shown in FIG. 5.

Figure 6:
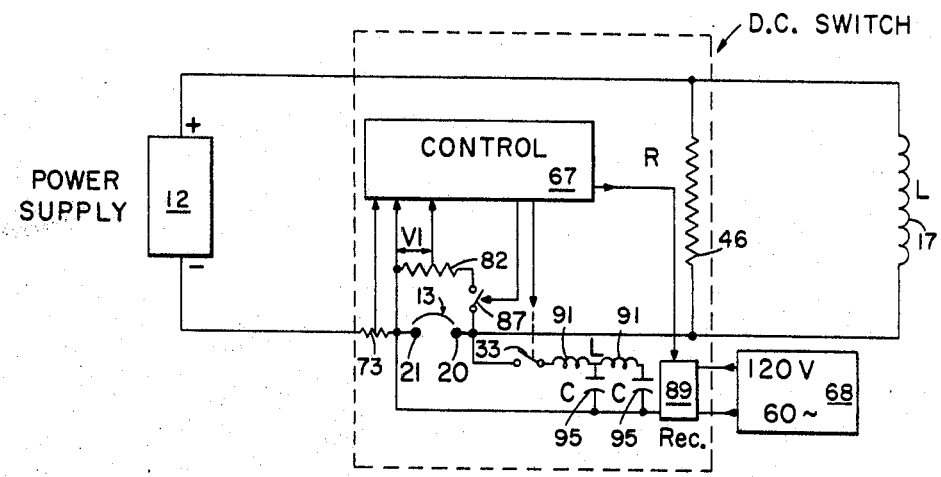
FIG. 6 is a partial schematic diagram of another embodiment of the circuit of this invention for use with the switch of FIG. 5 for plasma research apparatus.

Alternately, the breaker 13 is initially tripped manually (FIG. 6), or on fault current wherein the auxiliary discharge circuit has a switch 33, and a control 67 that closes the switch 33 at the optimum time to drive the current through the breaker 13 to zero, and a particular combination of capacitors 95 and inductors 91 that provide energy storage for driving the current through the breaker 13 to zero in the desired manner. In this embodiment, the transducer 73 provides information for control 67 and also is used to power an ammeter that measures the power from supply 12. The control 67 receives inputs from transductor 73 and arc voltage $V_1$ across the switch 13 by way of resistor 82, regulates the charge on the capacitors 95 and also operates switches 33, and 87 at the proper time. Switch 33, in the auxiliary circuit may be an ignitron, spark gap or solid state switch. Switch 87, which removes or opens the resistor circuit 82 is optional for many applications. As described, however, resistor 82 is advantageously an arc voltage sensing element that is used to supply input signal $V_1$ to controller 67. Rectifier 89 supplies energy to the auxiliary circuit by suitably charging capacitor 95.

Inductors 91 and capacitors 95 are energy storage devices designed to drive the arc current in switch 13 to zero in the desired manner. To this end these components are selected to provide the desired rise and fall of the pulsed current in discharge circuit.

R is the circuit load resistance which limits the induced voltage across the energy storage inductance L to the desired value. In this regard, a non-linear resistance 46 has the advantage of reducing the current in the inductor 17 in a minimum time, which is desired in stellarators.

In operation, the basic devices are switch 13, switch 33, inductor 91, and capacitor 95. When switch 13 opens, control 67 responds to the signal from transductor 73, which senses the current arc in switch 13 from power supply 12 to load 17, and switch 13 arc voltage through resistance sensor 82, thus to close switch 33, to inject the stored energy in capacitor 95 from discharge circuit to switch 13 and to cause the arc current to be forced to zero.

This invention has the advantage of providing a practical, economic and effective system for switching heavy direct currents using arc interrupting devices with a pulsing circuit that forces the arc current to zero. Moreover, actual tests have shown the system of this invention to be effective in interrupting large inductive loads in plasma research with a pulsing circuit wherein the ratio of the energy stored in the inductor to the energy stored in the pulse circuit was 500:1.

What is claimed is:

1. In an apparatus for extinguishing arcs in a breaker for disconnecting a DC source, comprising means having inductive energy stored therein, from a high voltage, high energy, inductive energy storage system for confining a high temperature plasma, wherein the inductive storing system forms a load having a resistance connecting the opposite ends thereof, and wherein said breaker has separable contacts, arc chutes for splitting an initial arc produced across said separable contacts when said contacts are opened to disconnect said source from said load, and capacitance means for injecting current across said separable contacts, the improvement, comprising inductance means forming a series oscillatory circuit with said capacitance means for producing an oscillatory current therein for slowing down the current and voltage drop across the separable contacts when they are opened to produce said arc, whereby the current and voltage across said separable contacts is controlled to improve the extinguishing of said arc, said initial arc is extinguished effectively with a small capacitance having a small initial charge therein relative to the maximum energy stored in said load, and reverse voltage across said separable contacts is held off for preventing reverse arcing thereacross due to a sudden change from a positive to a negative voltage drop across said separable contacts after the same are opened.

2. The invention of claim 1 in which said capacitance and inductance means form a plurality of oscillatory series connected LC circuits for providing an oscillatory current therein at a frequency of between 130 and 1000 Hz. for holding off said reverse voltage said separable contacts.

3. The invention of claim 1 which said capacitance and inductance means form a plurality of oscillatory series connected LC circuits for connecting said capacitance means and inductance means in series across said separable contacts, and means for connecting said plurality of LC circuits in parallel across said separable contacts after a time delay beginning when said contacts are opened for producing a predetermined voltage drop level across said contacts in said initial arc and for controlling the current in said initial arc for extinguishing said initial arc in said arc chutes, for preventing over voltages in said source, for holding off said reverse voltage across said contacts for preventing reverse arcing across said contacts.

4. The invention of claim 1, comprising a plurality of oscillatory series connected LC circuits formed by said capacitance and inductance means, means for connecting said oscillatory series connected LC circuits in parallel across said separable contacts after a time delay beginning when said separable contacts open to form said initial arc for controlling the voltage and current in said arc, alternating current source means having a rectifier for initially charging said capacitance means with a charge that is 1/500 of the maximum energy stored in said load, and means for connecting said LC circuits in parallel across said contacts for providing a predetermined time delay of 350 μsec. after said separable contacts open to produce said initial arc for extinguishing said initial arc in said arc chutes while preventing over voltages in said sources, and for preventing reverse arcs across said separable contacts after said initial arc is extinguished by holding off reverse voltages across said contacts.

References Cited

UNITED STATES PATENTS

| 2,595,024 | 4/1952 | Toulon | 307—136 |
| 2,789,253 | 4/1957 | Vang. | |
| 3,105,171 | 9/1963 | Matthews | 307—136 X |
| 3,309,570 | 3/1967 | Goldberg. | |

ROBERT K. SCHAEFER, Primary Examiner

T. B. JOIKE, Assistant Examiner

U.S. Cl. X.R.

317—11